: US 8,944,947 B2
(45) Date of Patent: Feb. 3, 2015

(12) United States Patent
Yamatani et al.

(54) PULLEY UNIT

(75) Inventors: Tomoya Yamatani, Toyota (JP); Hajime Watanabe, Kashiwara (JP); Hideki Fujiwara, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 298 days.

(21) Appl. No.: 12/736,277

(22) PCT Filed: Mar. 26, 2008

(86) PCT No.: PCT/JP2008/055691
§ 371 (c)(1),
(2), (4) Date: Sep. 24, 2010

(87) PCT Pub. No.: WO2009/118834
PCT Pub. Date: Oct. 1, 2009

(65) Prior Publication Data
US 2011/0015018 A1    Jan. 20, 2011

(51) Int. Cl.
*F16H 55/36* (2006.01)
*F02N 15/02* (2006.01)
*F02B 67/06* (2006.01)
*F02N 15/08* (2006.01)

(52) U.S. Cl.
CPC ............ *F16H 55/36* (2013.01); *F02N 15/023* (2013.01); *F02B 67/06* (2013.01); *F02N 15/08* (2013.01); *F16H 2055/366* (2013.01)
USPC ....................................................... 474/166

(58) Field of Classification Search
USPC ...................................... 474/166, 94; 192/45
See application file for complete search history.

(56) References Cited

U.S. PATENT DOCUMENTS

| 5,139,463 | A | * | 8/1992 | Bytzek et al. ................... 474/69 |
| 5,598,913 | A | * | 2/1997 | Monahan et al. ............. 192/41 S |
| 5,669,476 | A | * | 9/1997 | Lederman ................ 192/45.016 |
| 6,083,130 | A | * | 7/2000 | Mevissen et al. ............... 474/70 |
| 6,095,301 | A | * | 8/2000 | Fujiwara et al. ......... 192/45.008 |
| 6,394,247 | B1 | * | 5/2002 | Monahan et al. ............ 192/41 S |
| 6,588,560 | B1 | * | 7/2003 | Fujiwara .................. 192/45.015 |

(Continued)

FOREIGN PATENT DOCUMENTS

| CN | 1856664 A | 11/2006 |
| JP | 2005-163932 | 6/2005 |

(Continued)

OTHER PUBLICATIONS

Chinese Office Action dated Oct. 10, 2012, with English translation.

*Primary Examiner* — William A Rivera
*Assistant Examiner* — Michael Riegelman
(74) *Attorney, Agent, or Firm* — McGinn IP Law Group, PLLC

(57) ABSTRACT

A rotation adjusting mechanism is provided in a power transmission path from a pulley to a rotation shaft and includes an elastic member and a clutch mechanism. The elastic member reduces a minute change in rotation generated in at least one of the pulley and the rotating shaft by its elastic deformation. The clutch mechanism is provided in an intermediate position of the power transmission path from the elastic member to the rotating shaft and configured to interrupt the power transmission from the pulley to the rotating shaft when a rotation speed of the pulley lowers below a rotation speed of the rotating shaft by a predetermined value or greater.

18 Claims, 9 Drawing Sheets

(56) References Cited

U.S. PATENT DOCUMENTS

| | | | |
|---|---|---|---|
| 6,830,137 B2* | 12/2004 | Fujiwara | 192/45.015 |
| 6,964,326 B2* | 11/2005 | Kamping | 192/55.5 |
| 7,056,247 B2* | 6/2006 | Fujiwara et al. | 474/199 |
| 7,143,881 B2* | 12/2006 | Ichihara et al. | 192/45.009 |
| 7,153,227 B2* | 12/2006 | Dell et al. | 474/70 |
| 7,624,852 B2* | 12/2009 | Mevissen et al. | 192/41 S |
| 7,954,613 B2* | 6/2011 | Mevissen et al. | 192/41 S |
| 7,998,008 B2* | 8/2011 | Kamdem et al. | 474/94 |
| 2007/0037644 A1* | 2/2007 | Mevissen et al. | 474/70 |
| 2007/0066426 A1* | 3/2007 | Kamdem et al. | 474/94 |
| 2008/0078647 A1* | 4/2008 | Watanabe et al. | 192/41 A |
| 2010/0032258 A1 | 2/2010 | Mevissen et al. | |

FOREIGN PATENT DOCUMENTS

| | | |
|---|---|---|
| JP | 2006-329407 | 12/2006 |
| JP | 2007-85539 | 4/2007 |
| JP | 2008-82508 | 4/2008 |
| WO | WO 98/50709 A1 | 11/1998 |

* cited by examiner (a)

(b)

(c)

(a)

(b)

(a)

(b)

PULLEY UNIT

TECHNICAL FIELD

The present invention relates to a pulley unit.

BACKGROUND ART

For example, when an alternator is driven by a crankshaft of an automotive engine via a belt, a pulley unit, etc., a pulsating change in rotation (a change in acceleration during rotation) may be generated on the crankshaft as a result of repetition of induction, compression, combustion and expansion, and exhaust strokes. When such a change in rotation is generated, an excessive rotating torque (torsion) or tension may be generated on a pulley, a rotating shaft or the belt. As an example, there is a tendency that the rotation of the crankshaft drops momentarily on the compression stroke or the like. However, since the alternator has large inertia, its rotating shaft cannot follow immediately the drop in rotation of the crankshaft (an alternator pulley), and an excessive rotating torque is generated between the rotating shaft and the pulley. As a result, the belt is pulled in a direction in which the torque is generated and a change in tension is produced, which may produce an overload in the belt or may reduce life of the belt. Then, with a view to preventing the production of the overload in the belt or the reduction in life of the belt, there has been known a technique in which a spring type one-way clutch and a torsion coil spring are interposed between a pulley and a rotating shaft (for example, see WO98/50709 (JP-T-2001-523325)).

According to the technique of WO98/50709, as is shown in FIG. 9, an overload produced in a belt by such a change in rotation as described above can be reduced by interrupting power by a spring type one-way clutch 76 or torsion deforming a torsion coil spring 74 in an elastic fashion. In WO98/50709, power from an engine is transmitted along a path from a pulley 106 to a shaft 36 via the spring type one-way clutch 76 and the torsion coil spring 74. In addition, an inner circumferential surface of the pulley 106 and the torsion coil spring 74 (an outer circumferential surface of an outer sleeve 64) are connected together so as to enable a circumferential relative displacement by a sleeve bushing 112 which is interposed therebetween. Because of this, every time power is interrupted by the clutch 76, the sleeve bushing 112 is subjected to rotational sliding of the outer sleeve 64 to wear, and there may be a case in which the sleeve bushing 112 is broken.

DISCLOSURE OF THE INVENTION

Problem to be Solved by the Invention

An object of the invention is to provide a pulley unit with a long life by preventing the occurrence of wear, for example, in an interposed member (a bushing or the like) between a pulley around which a belt is wound and an elastic member which elastically deforms based on a change in rotation.

Means for Solving the Problem

In order to solve the problem, in a pulley unit of the present invention, one of a pulley around which a belt is wound and a rotating shaft disposed concentrically with and rotatable along with the pulley serves as a drive member and the other thereof serves as a driven member, and a rotation adjusting mechanism is interposed in a transmission path from the drive member to the driven member, wherein the rotation adjusting mechanism comprises:
an elastic member provided in an intermediate position of the transmission path and configured to elastically deform based on a change in rotation generated in at least one of the drive member and the driven member; and
a clutch mechanism provided in an intermediate position of the transmission path from the elastic member to the driven member and configured to interrupt a power transmission from the drive member to the driven member when a rotation speed of the drive member lowers below a rotation speed of the rotating shaft by a predetermined value or greater, wherein a minute change in rotation generated mainly on the drive member side is reduced by an elastic deformation of the elastic member, and wherein a change in rotation generated mainly on the drive member side which is greater than the minute change in rotation is eliminated by an interruption of the power by the clutch mechanism.

Further, in order to solve the problem, in a specific aspect of a pulley unit of the present invention, a rotation adjusting mechanism is interposed in a transmission path from a pulley around which a belt is wound to a rotating shaft disposed concentrically with and rotatable along with the pulley, wherein the rotation adjusting mechanism comprises:
an elastic member provided in an intermediate position of the transmission path and configured to elastically deform based on a change in rotation generated in at least one of the pulley and the rotating shaft; and
a clutch mechanism provided in an intermediate position of the transmission path from the elastic member to the rotating shaft and configured to interrupt a power transmission from the pulley to the rotating shaft when a rotation speed of the pulley lowers below a rotation speed of the rotating shaft by a predetermined value or greater, wherein a minute change in rotation generated mainly on the pulley side is reduced by an elastic deformation of the elastic member, and wherein a change in rotation generated mainly on the pulley side which is greater than the minute change in rotation is eliminated by an interruption of the power by the clutch mechanism.

In this way, the transmission path from the drive member (the pulley or the rotating shaft) to the driven member (the rotating shaft or the pulley) is formed, for example, from the pulley to the rotating shaft via the elastic member and the clutch mechanism, and the elastic member which elastically deforms based on the change in rotation is disposed on an upper side of the power transmission (a more upstream side of the power transmission) than the clutch mechanism which interrupts the power transmission. Accordingly, for example, a bush (a holding member) which is interposed between the pulley and the elastic member is prevented from being subjected to rotational sliding of the elastic member (or an accommodation case for the elastic member) and is hence made difficult to wear even in the event that power is interrupted by the clutch mechanism, whereby the life of the bush and hence the life of the pulley unit is extended.

In addition, in the event that the elastic member includes a coil spring made of a spring steel which is specified under JIS G480101984 (spring steel material), a torsion spring constant can easily be obtained which is good enough to reduce a change in tension on the belt. Additionally, in addition to the spring type one-way clutch, a roller type one-way clutch or a sprag type one-way clutch may be used for the clutch mechanism.

Consequently, the holding member may be disposed between the pulley and the elastic member which restricts a radial relative displacement of the elastic member while permitting a circumferential relative displacement between the pulley and the elastic member. The holding member is prevented from being subjected to rotational sliding of the elastic member (or the accommodation case for the elastic member) even in the event that power is interrupted by the clutch mechanism, whereby the life of the holding member and hence the life of the pulley unit is extended.

In addition to a bush made of casting alloy or sheet alloy of a bearing alloy which is specified under JIS B1582-1996 (sliding bearing bush), various types of rolling bearings can be used for the holding member.

Then, it is desired that the clutch mechanism is disposed radially outwards of the rotating shaft along a circumferential direction thereof and the elastic member is disposed radially outwards of the clutch mechanism along a circumferential direction thereof. By disposing and cylindrically overlapping the clutch mechanism and the elastic member so as to surround the rotating shaft, an axial length of the pulley unit can be shortened relatively.

As this occurs, the elastic member which is disposed so as to surround the clutch mechanism is preferably made of a coil spring having a rectangular shape in cross section. With the rectangular shape in cross section of the coil spring, compared with a circular section, the coil spring can be coiled into a more compressed state (with smaller gaps), and therefore, energy that can be stored can easily be increased by increasing the sectional area thereof. In the event that the coil spring has a laterally elongated section, the diameter of the elastic member can be reduced, whereas in the event that the coil spring has a vertically elongated section, the width of the elastic member can be reduced.

On the other hand, the clutch mechanism may be disposed radially outwards of the rotating shaft along the circumferential direction and further, the elastic member may be disposed at one axial end portion of the clutch mechanism so as to elastically deform in a plane which intersects an axis of the rotating shaft. By disposing the clutch mechanism so as to surround the rotating shaft and disposing the elastic member at the end portion of the clutch mechanism (the rotating shaft), a radial length of the pulley unit can be shortened relatively.

As this occurs, the elastic member may include a spiral coil spring disposed on a plane perpendicular to the axis of the rotating shaft.

BEST MODE FOR CARRYING OUT THE INVENTION

Embodiment 1

Figure 1:
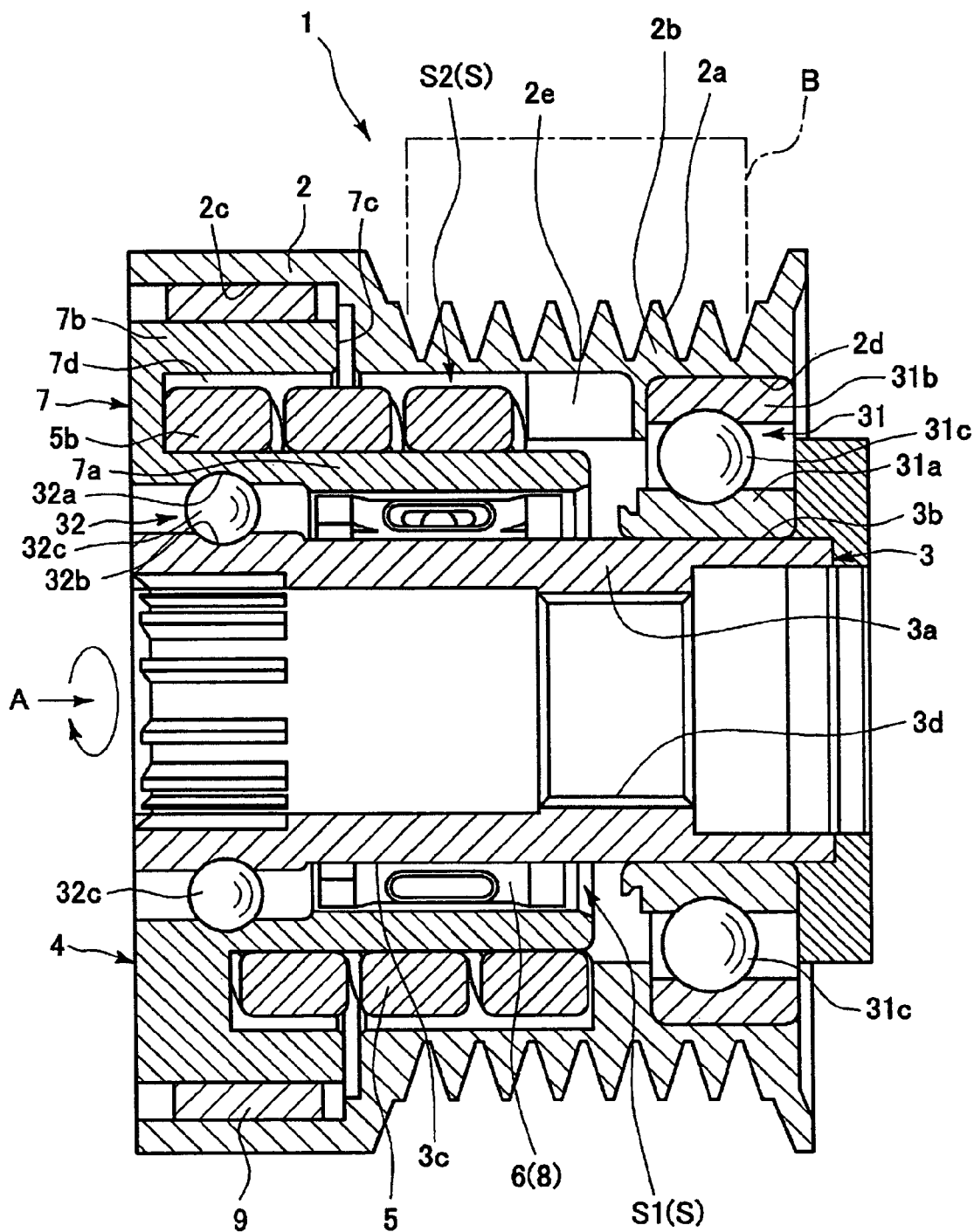
FIG. 1 is a front sectional view showing a pulley unit according to an embodiment of the invention.

Hereinafter, a mode for carrying out the invention will be described by reference to embodiments shown in the drawings. FIG. 1 is a front sectional view showing an embodiment of a pulley unit according to the invention. FIG. 1 shows a pulley unit 1 of an alternator (not shown) which is driven by an automotive engine (not shown), and the pulley unit 1 includes an alternator pulley 2 (a pulley) as a drive member to which a driving force from an engine is transmitted from a belt B, an alternator shaft 3 (a rotating shaft) as a driven member which is disposed concentrically with the alternator pulley 2 so as to rotate together therewith, and a rotation adjusting mechanism 4 which is interposed between the alternator pulley 2 and the alternator shaft 3.

The rotation adjusting mechanism 4 is provided in a power transmission path which extends from the alternator pulley 2 to the alternator shaft 3 and includes mainly a coil spring 5 as an elastic member and a clutch mechanism 6 which has a function to switch between transmission and interruption of power. Then, power of the alternator pulley 2 is transmitted from the coil spring 5 to the alternator shaft 3 by way of the clutch mechanism 6 which is in a power transmission state.

The coil spring 5 deforms elastically based on a change in rotation generated in at least either of the alternator pulley 2 and the alternator shaft 3. The coil spring 5 reduces a minute change in rotation generated mainly on the alternator pulley's 2 side by its elastic deformation. The clutch mechanism 6 is provided in an intermediate position of the power transmission path which extends from the coil spring 5 to the alternator shaft 3 and interrupts the power transmission from the alternator pulley 2 to the alternator shaft 3 when the rotation speed of the alternator pulley 2 lowers below the rotation speed of the alternator shaft 3 by a predetermined value or greater.

This clutch mechanism 6 is disposed radially outwards of the alternator shaft 3 along a circumferential direction thereof. In addition, the coil spring 5, which has a rectangular shape in cross section, is disposed radially outwards of the clutch mechanism 6 along a circumferential direction thereof so as to surround the clutch mechanism 6.

A bush 9 (a holding member) is disposed between the alternator pulley 2 and the alternator shaft 3 and is configured to restrict a radial relative displacement of the coil spring 5 while permitting a circumferential relative displacement between the alternator pulley 2 and the coil spring 5. This bush 9 is formed into a cylindrical shape as a sliding bearing.

The alternator pulley 2 includes a cylindrical pulley main body 2b in which wave-shaped grooves 2a are formed on an outer circumferential side thereof so that the belt B is wound therearound, and a bush mounting step portion 2c is formed on an inner circumferential side of the pulley main body 2b at an axial end side (a left end side) thereof. In addition, a bearing mounting step portion 2d is formed at the other axial end side (a right end side). Additionally, a pressing wall portion 2e is formed between the bush mounting portion 2c and the bearing mounting portion 2d which presses a receiving portion 5a of the coil spring 5 which lies at an initiating end side for elastic deformation.

The alternator shaft 3 includes a shaft main body 3a which is formed into a cylindrical shape, and cam planes 3c are formed on an axially intermediate portion of an outer circumferential surface 3b of the shaft main body 3a so as to constitute the clutch mechanism 6. An alternator input shaft (not shown) is fixedly screwed in a mounting shaft hole 3*d* which is formed in a central portion of the shaft main body 3*a*.

The alternator pulley 2 is positioned outwards of and concentrically with the alternator shaft 3 so as to define an annular accommodation space portion S between the alternator shaft 3 and the alternate pulley 2.

A ball bearing 31 (a rolling bearing; a bearing portion) is interposed between the bearing mounting step portion 2*d* of the pulley main body 2*b* and the outer circumferential surface 3*b* of the shaft main body 3*a* at the other axial end side (the right end side) of the alternator shaft 3 and the alternator pulley 2. The ball bearing 31 has an annular inner ring 31*a* (an inner bearing ring) which is fixed to the outer circumferential surface 3*b* of the shaft main body 3*a*, an annular outer ring 31*b* (an outer bearing ring) which is fixed to the bearing mounting step portion 2*d* of the pulley main body 2*b* and a plurality of balls 31*c* (rolling elements) which roll between the inner ring 31*a* and the outer ring 31*b*. The balls 31 of the ball bearing 31 may be arranged in double rows in addition to a single row shown in the figures.

A support member 7 is disposed within the accommodation space portion S which is defined between the alternator shaft 3 and the alternator pulley 2 which holds the coil spring 5 and constitutes the clutch mechanism 6. This support member 7 includes a cylindrical portion 7*a* which is formed into a cylindrical shape and a disc-shaped flange portion 7*b* which projects outwards from an axial end side (a left-hand side) of the cylindrical portion 7*a*; the cylindrical portion 7*a* and the disc-shaped flange portion 7*b* being formed integrally. An annular spring accommodation recess portion 7*d* is formed on a radially inner side of an end face 7*c* of the other axial end side (a right-hand side) of the flange portion 7*b* which has an inner circumferential wall surface which continues to an outer circumferential surface of the cylindrical portion 7*a* levelly. A rotation restricting wall portion 7*e* (refer to FIG. 2) is formed within the spring accommodation recess portion 7*d* which is brought into abutment with a receiving portion 51*b* at a terminating end side of the coil spring 5 so as to restrict the rotation of the coil spring 5.

This support member 7 is disposed concentrically with the alternator shaft 3 and the alternator pulley 2 within the accommodation space portion S. The cylindrical portion 7*a* of the support member 7 functions as a dividing member which divides the accommodation space portion S and divides and defines an inside of the cylindrical portion 7*a* into a clutch accommodation space portion S1 and divides and defines an outside of the cylindrical portion 7*a* into a spring accommodation space portion S2.

The bush 9 is disposed between an outer circumferential surface of the flange portion 7*b* of the cylindrical portion 7*a* and the bush mounting step portion 2*c* of the alternator pulley 2 which lies at the axial end side (the left end side) thereof. An outer circumferential side of the bush 9 is fixedly press fitted in the bush mounting step portion 2*c*, and an inner circumferential side thereof is provided on the outer circumferential surface of the flange portion 7*b* of the support member 7 so as to slide freely thereon. By this configuration, the support member 7 is made to rotate freely relative to the alternator shaft 3 and the alternator pulley 2.

A ball bearing portion 32 is disposed between the cylindrical portion 7*a* of the support member 7 and the alternator shaft 3 at the axial end side (the left-hand side). This ball bearing portion 32 includes an outer ring raceway 32*a* which is formed on an inner circumferential surface of the cylindrical portion 7*a* of the support member 7, an inner ring raceway 32*b* which is formed on the outer circumferential surface 3*b* of the alternator shaft 3 and a plurality of balls 32*c* (rolling elements) which roll between the inner ring raceway 32*b* and the outer ring raceway 32*a*. The ball bearing portion 32 restricts an axial relative displacement between the support member 7 and the alternator shaft 3 while permitting a relative rotation therebetween. Balls 32*c* of the ball bearing portion 32 may be arranged in double rows in addition to a single row shown in the figures.

Figure 3:
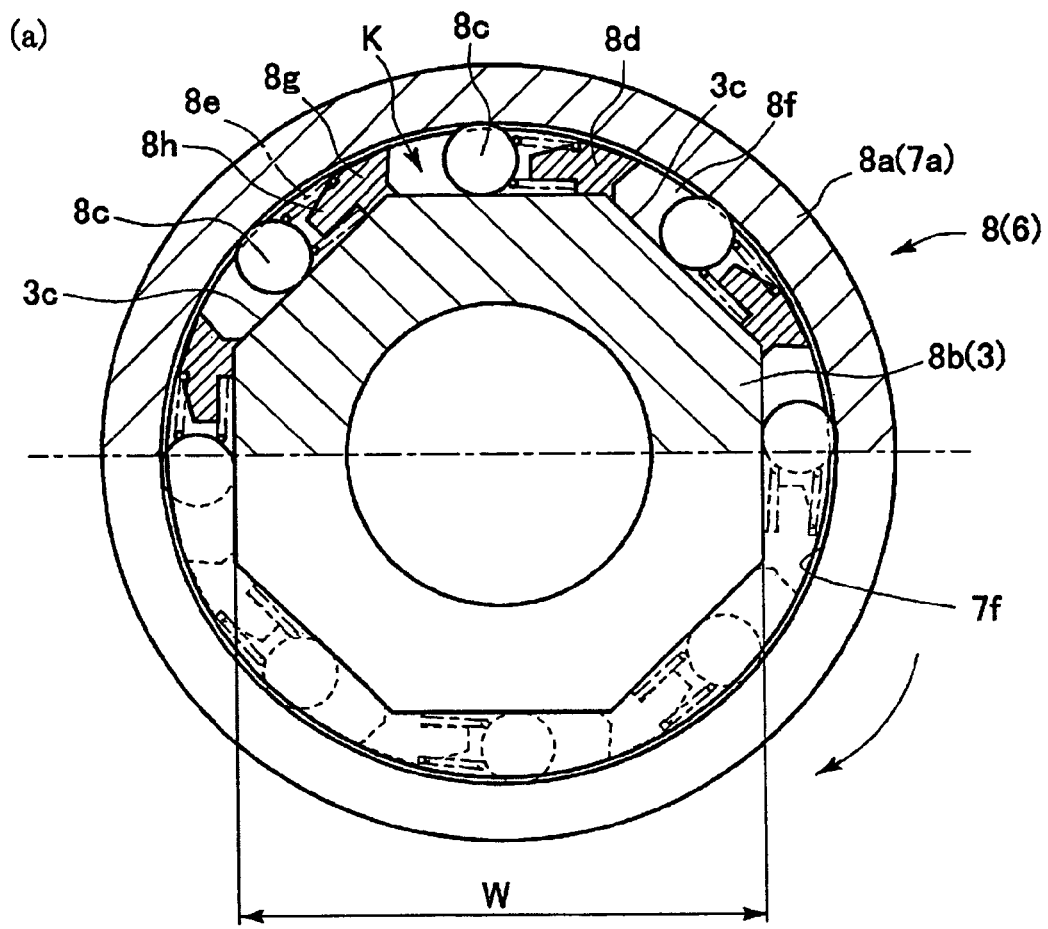
FIG. 3 is a sectional view and operation diagram of a roller type one-way clutch portion used in FIG. 1.
Figure 3:
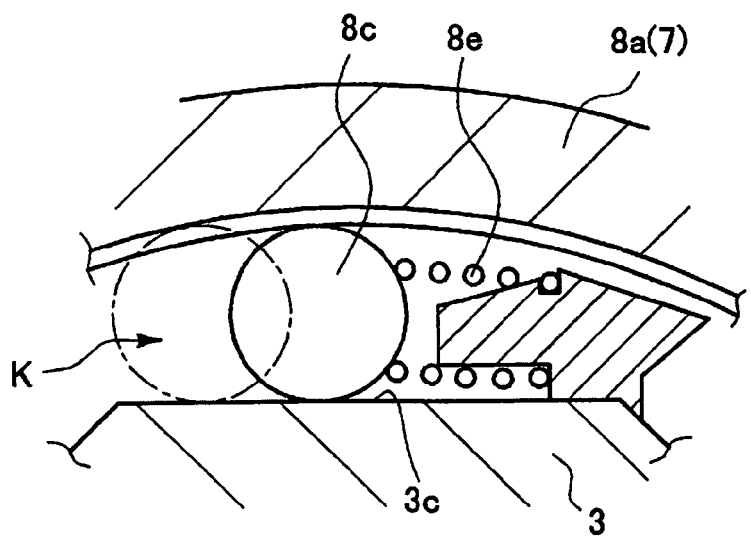

As is shown in FIG. 3, in the clutch mechanism 6, a one-way clutch portion 8, which has a function to switch between power transmission and power interruption, is provided within the clutch accommodation space portion S1 (refer to FIG. 1) which lies radially outwards of the alternator shaft 3. A roller type clutch is adopted for the one-way clutch portion 8. The one-way clutch portion 8 includes the cylindrical portion 7*a* of the support member 7 which functions as an outer ring 8*a*, the alternator shaft 3 having the cam planes 3*c* which functions as an inner ring 8*b*, a plurality of (for example, eight) cylindrical rollers 8*c* which are disposed within an annular space defined between the outer ring 8*a* and the inner ring 8*b* with their axes being oriented to follow the axial direction, an annular cage 8*d* made of a synthetic resin and adapted to hold the rollers 8*c* within the annular space, and compression coils 8*e* (biasing members) which bias towards an opposite direction to the rotating direction of the outer ring 8*a* (for example, a clockwise direction) within the annular space.

The cage 8*d* is fitted on corner portions between the cam planes 3*c* of the alternator shaft 3 as press fitting portions so as to restrict circumferential and axial relative displacements of the rollers 8*c*. Here, the cam planes 3*c* are such that their rotating radius changes along the circumferential direction and include rectangular planes which make up a regular polygonal (a regular octagonal) section having a bihedral width W. Then, wedge-shaped spaces K are formed between an inner circumferential surface 7*f* of the cylindrical portion 7*a* of the support member 7 as the outer ring 8*a* and the cam planes 3*c* as the inner ring 8*b* whose radial gaps change in the circumferential direction.

A plurality of (for example, eight) pocket portions 8*f* are formed along the circumferential direction of the cage 8*d* which pass through the cage 8*d* radially. The rollers 8*c* are accommodated rotatably in the pocket portions 8*f*. In addition, the compression coil springs 8*e* are each attached to a projection 8*h* which is formed to extend from a pillar portion 8*g* which defines the pocket portion 8*f* into the pocket portion 8*f* at one end side and are each brought into abutment with the roller 8*c* at the other end side. Then, the roller 8*c* is biased in a direction in which the wedge-shaped space K is narrowed (for example, a counterclockwise direction) by the compression coil spring 8*e* and is allowed to move on its corresponding cam plane 3*c* by the biasing force.

Figure 2:
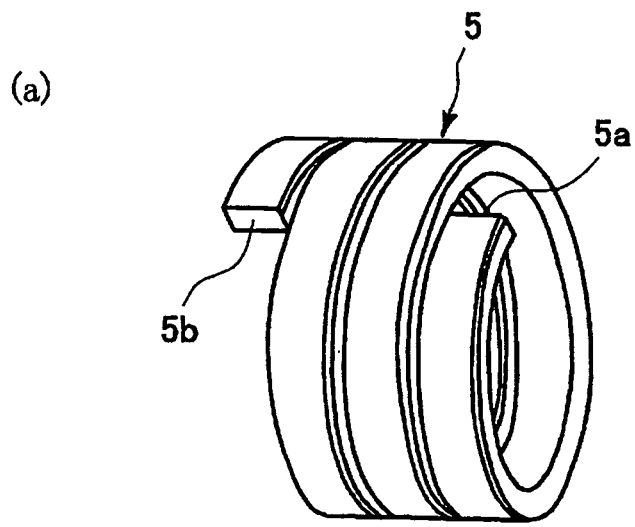
FIG. 2 is a perspective view and operation diagram of a coil spring used in FIG. 1.
Figure 2:
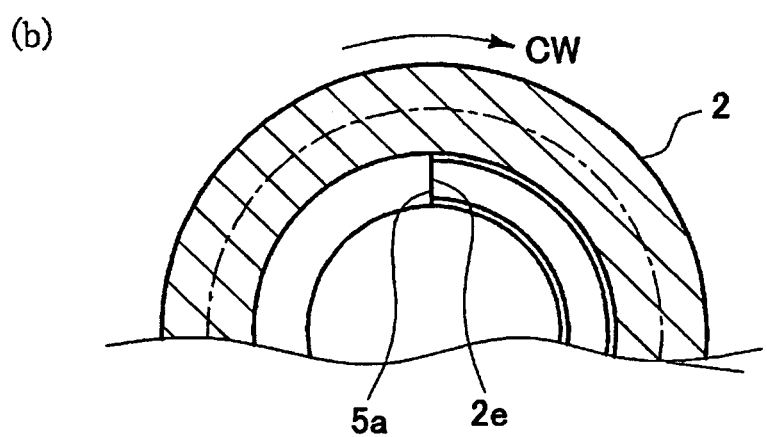
Figure 2:
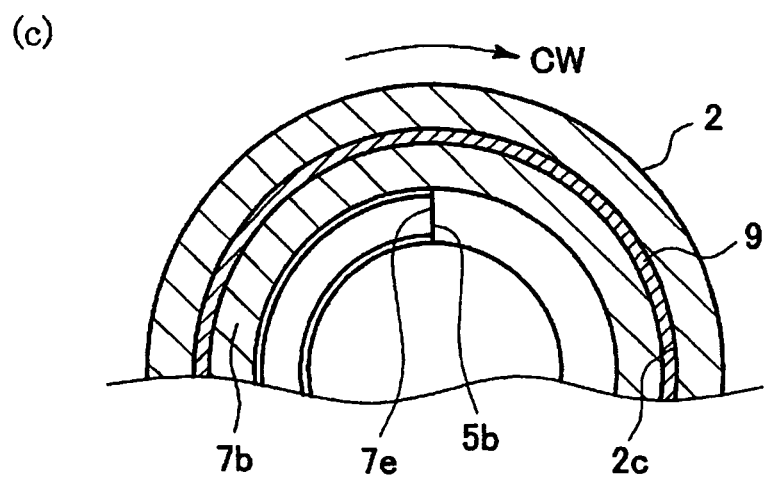

The coil spring 5 is formed into a coil shape of a spring steel material having a rectangular shape in cross section as is shown in FIG. 2. The coil spring 5 includes the receiving portions 5*a*, 5*b*, which are each formed into a planar surface shape, at the initiating end and the terminating end thereof, respectively. In a free state, the coil spring 5 applies a spring force in a direction in which its diameter extends. The rectangular sectional form includes a laterally elongated rectangular shape and a vertically elongated rectangular shape.

Referring back to FIG. 1, the coil spring 5 is disposed radially outwards of the clutch mechanism 6 along the circumferential direction thereof so as to surround the clutch mechanism 6. In addition, the coil spring 5 is loosely fitted on an outside of the cylindrical portion 7*a* of the support member 7 within the spring accommodation space portion S2 between the alternator pulley 2 and the cylindrical portion 7*a* of the support member 7. The terminating end side of the coil spring 5 is inserted into the spring accommodation recess portion 7d of the flange portion 7b of the support member 7. As is shown in FIG. 2, the receiving portion 5b at the terminating end is brought into abutment with the rotation restricting wall portion 7e (refer to FIG. 2), and the receiving portion 5a at the initiating end is brought into abutment with the pressing wall portion 2e of the alternator pulley 2.

Next, referring to FIGS. 1 to 3, the operation of the pulley unit 1 configured as has been described heretofore will be described. The alternator pulley 2 shown in FIG. 1 is rotating at a set rotation speed (for example, 5000 rpm) in the clockwise direction as viewed from a direction indicated by an arrow A in the figure. As this occurs, as is shown in FIG. 2(c), the coil spring 5 which is positioned on the upstream side of the power transmission path is restricted from rotation by the receiving portion 5b at the initiating end being in abutment with the rotation restricting wall portion 7e of the support member 7. Because of this, the coil spring 5 elastically deforms by a pressing force applied thereto when the receiving portion 5a at the initiating end thereof is brought into abutment with the pressing wall portion 2e of the alternator pulley 2, and power is transmitted to the support member 7 which configures the one-way clutch portion 8 by the deformation. An outer circumference of the coil spring 5 which elastically deforms to increase its diameter is not brought into contact with the flange portion 7b of the support member 7 and the alternator pulley 2.

As is shown in FIG. 3, when the alternator pulley 2 rotates in the clockwise direction (in a direction indicated by an arrow), a locked state (a power transmissive state) is produced in which the rollers 8c are squeezed into a narrow side of the wedge-shaped spaces K by the spring force of the compression coil springs 8e. Consequently, power produced by the rotation of the alternator pulley 2 is transmitted sequentially to the coil spring 5, the support member 7, the clutch mechanism 6 and the alternator shaft 3 in that order.

Here, when the rotation speed of the alternator 2 surpasses the rotation speed of the alternator shaft 3 (when the rotation speed of the alternator shaft 3 lowers below the rotation speed of the alternator pulley 2), the one-way clutch portion 8 (the clutch mechanism 6) holds the locked state, whereby the power transmission from the alternator pulley 2 to the alternator shaft 3 continues.

On the other hand, when the rotation speed of the alternator pulley 2 lowers below the rotation speed of the alternator shaft 3 by a predetermined value or greater (when the rotation speed of the alternator shaft 3 surpasses the rotation speed of the alternator pulley 2 by the predetermined value or greater), the alternator shaft 3 seemingly rotates in the counterclockwise direction as is shown in FIG. 3(b). Then, the rollers 8c, which have been squeezed into the narrow side of the wedge-shaped spaces K of the one-way clutch portion 8, move to a wide side of the wedge-shaped spaces K, whereby the locked state is released. By the release of the locked state, the clutch mechanism 6 is put in a free state (a power interruption state), whereby the one-way clutch portion 8 interrupts the power transmission from the alternator pulley 2 to the alternator shaft 3. However, since the bush 9 is disposed between the alternator pulley 2 and the coil spring 5 (the support member 7), the bush 9 is allowed to rotate together with the alternator pulley 2 even in the event that the one-way clutch portion 8 interrupts the power transmission, and the wear of the bush 9 due to rotational sliding of the coil spring 5 (the support member 7) is made difficult to occur.

A pulsating minute change in rotation generated on the induction, compression, combustion and expansion and exhaust strokes of the engine is absorbed (reduced) by the elastic deformation of the coil spring 5.

Modification

Figure 8:
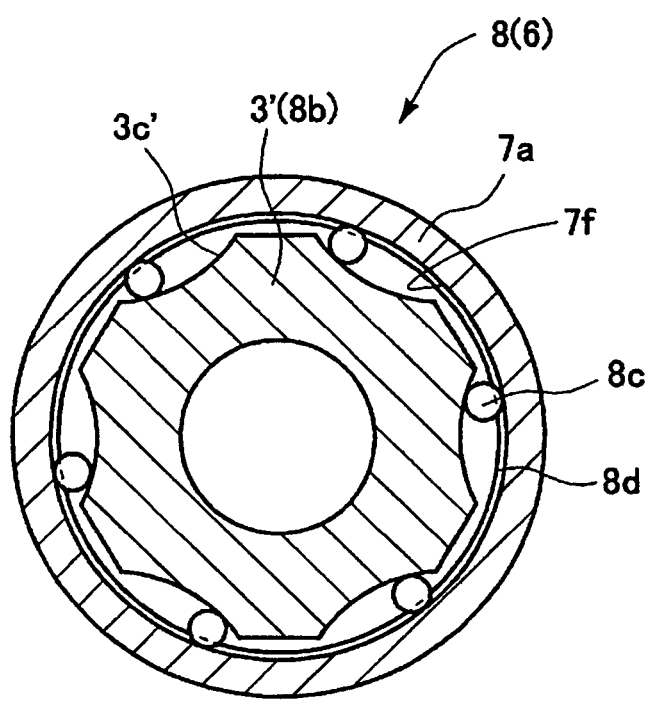
FIG. 8 is a diagram showing a main portion in cross section according to a modification of FIG. 3.
Figure 9:
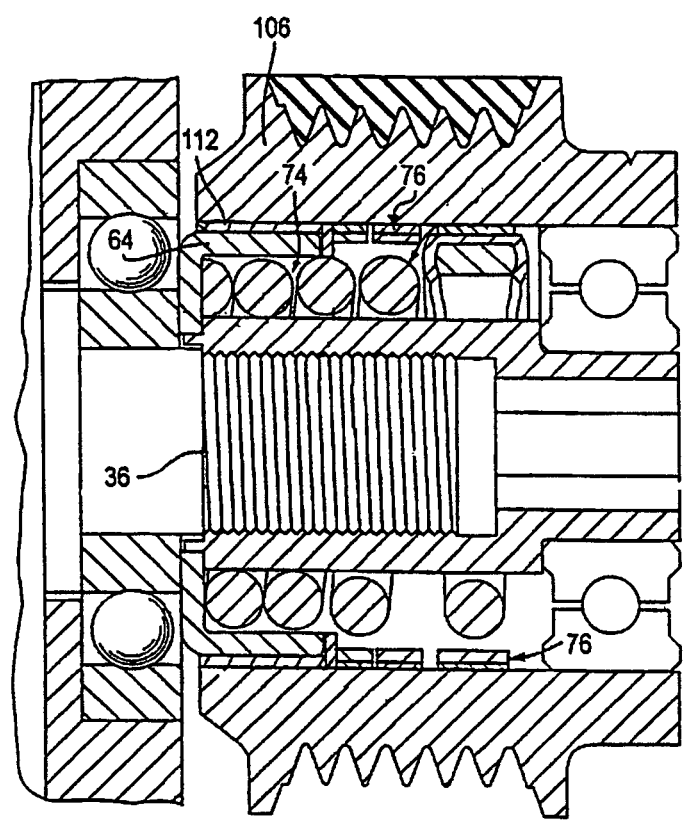
FIG. 9 is a front sectional view showing a conventional pulley unit.

In the one-way clutch portion 8 (the clutch mechanism 6) of Embodiment 1, in place of the alternator shaft 3 having the polygonal section shown in FIG. 3, an alternator shaft 3' (an inner ring 8b) having a section shaped by a series of concave surfaces may be used in which cam planes 3c' having a concavely curved or arc-like surface are formed as is shown in FIG. 8.

Embodiment 2

Figure 4:
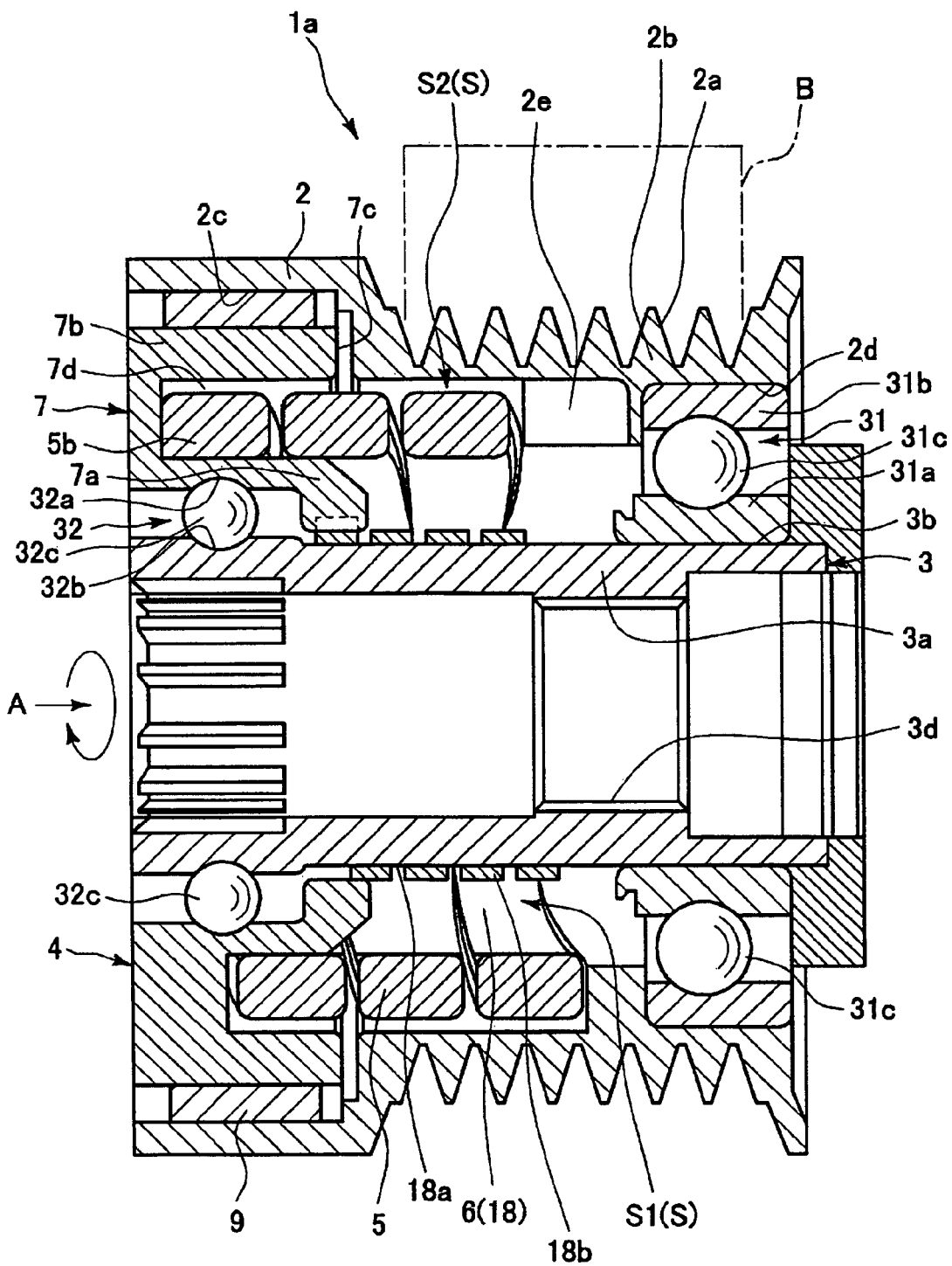
FIG. 4 is a front sectional view showing a pulley unit according to another embodiment of the invention.

Next, FIG. 4 is a front sectional view showing another embodiment of a pulley unit according to the invention. In a pulley unit 1a in FIG. 4, the roller type one-way clutch portion 8 which configures the clutch mechanism 6 is changed to a spring type one-way clutch portion 18. This one-way clutch portion 18 includes a circular clutch plane 18a on an outer circumferential surface 3b of a shaft main body 3a of an alternator shaft 3 (a rotating shaft; a driven member) between a ball bearing 31 and a ball bearing portion 32.

A clutch spring 18b is disposed radially outwards of this clutch plane 18a along a circumferential direction thereof. This clutch spring 18b is formed into a coil shape of a spring steel material having a rectangular shape in cross section and is used in a direction in which its diameter is reduced in a free state. An initiating end side (a right-hand side) of this clutch spring 18a is connected to the alternator shaft 3 in such a state that its circumferential displacement is restricted. In addition, a terminating end side (a left-hand side) of the clutch spring 18a is connected to a cylindrical portion 7a of a support member 7 which is driven to rotate via a coil spring 5 (an elastic member) by the power of an alternator pulley 2 (a pulley; drive member).

Then, when the rotation speed of the alternator shaft 3 lowers below the rotation speed of the alternator pulley 2, an inner circumferential surface of the clutch spring 18b is contracted diametrically so as to be brought into contact with the clutch plane 18a of the alternator shaft 3, and a locked state (a power transmissive state) continues by a frictional force applied to this contact plane. On the other hand, when the rotation speed of the alternator shaft 3 surpasses the rotation speed of the alternator pulley 2 by a predetermined value or larger on the contrary, the inner circumferential surface of the clutch spring 18b is expanded diametrically so as to be separated from the clutch plane 18a of the alternator shaft 3. As this occurs, the frictional force is released and a free state is produced, whereby the one-way clutch portion 8 is switched to interrupt the power transmission. In FIG. 4 (Embodiment 2), like reference numerals are given to portions having common functions to those in FIG. 1 (Embodiment 1), and the description thereof is omitted.

Embodiment 3

Figure 5:
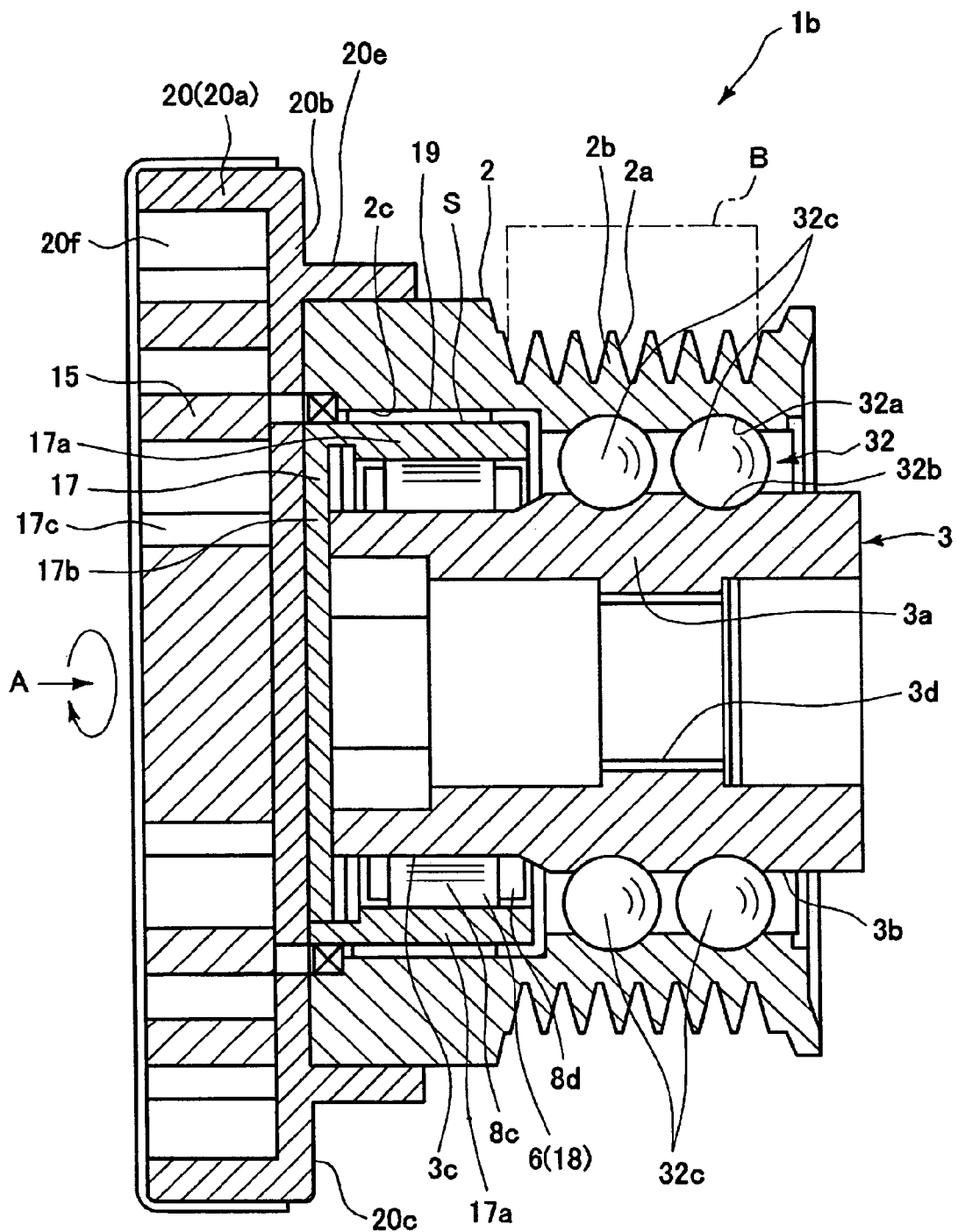
FIG. 5 is a front sectional view showing a pulley unit according to yet another embodiment of the invention.

Next, FIG. 5 is a front sectional view showing a further embodiment of a pulley unit according to the invention. In a pulley unit 1b in FIG. 5, the disposing position of the elastic member (the coil spring 5) in the pulley unit 1 shown in FIG. 1 (Embodiment 1) is changed which is disposed radially outwards of the clutch mechanism 6 which is disposed in the power transmission path so as to surround the clutch mechanism 6.

Namely, an annular elastic member holding member 20 which accommodates a spiral coil spring 15 (a spiral spring; an elastic member) is attached to an axial end (a left end) of a pulley unit 1b including a clutch mechanism 6. In addition, a support member 17 which is linked with the coil spring 15 within the elastic member holding member 20 is disposed within an accommodation space portion S defined between an alternator shaft 3 and an alternator pulley 2 which are disposed concentrically.

This support member 17 has a cylindrical portion 17a which is formed into a cylindrical shape and a mounting wall surface 17b which is formed integrally so as to be perpendicular to an axis of the alternator shaft 3 at an axial end side (a left-hand side) of the cylindrical portion 17a. In addition, a cylindrical boss 17c is formed integrally in the center of an axial end face (a left end face) of the mounting wall surface 17b so as to project in the same direction, and a locking slit 17d is cut out in the cylindrical boss 17c so as to penetrate therethrough in a radial direction (refer to FIG. 6).

A bush 19 (a holding member) is disposed between an outer circumferential surface of the cylindrical portion 17a of the support member 17 and a bush mounting step portion 2c at an axial end side (a left end side) of the alternator pulley 2. This bush 19 is formed into a collared cylindrical shape as a sliding bearing. The bush 19 is fixedly press fitted in the bush mounting step portion 2c on an outer circumferential side thereof and is provided slidably on the outer circumferential surface of the cylindrical portion 17a of the support member 17 on an inner circumferential side thereof. By adopting this configuration, the support member 17 rotates freely relative to the alternator shaft 3 and the alternator pulley 2.

The elastic member holding member 20 includes a bottomed cylindrical main body 20c in which a bottom wall 20b is formed integrally at one end of a cylindrical portion 20a. A through hole 20d through which the boss 17c of the support member 17 is inserted is opened in the center of the bottom wall 20b so that the boss 17c of the support member 17 is disposed within the cylindrical portion 20a (refer to FIG. 6). In addition, a circumferential wall portion 20e is formed integrally on the bottom wall 20b so as to project therefrom to the other axial end side. A pressing projection 20f is formed integrally on the circumferential wall portion 20e within the main body 20c so as to extend towards a center side (refer to FIG. 6).

Then, an outer circumferential surface of an axial end side of the alternator pulley 2 is press fitted in the circumferential wall portion 20e of the elastic member holding member 20. Accordingly, the elastic member holding member 20 and the alternator pulley 2 are connected together to thereby restrict a relative rotation (to thereby enable them to rotate together).

Figure 6:
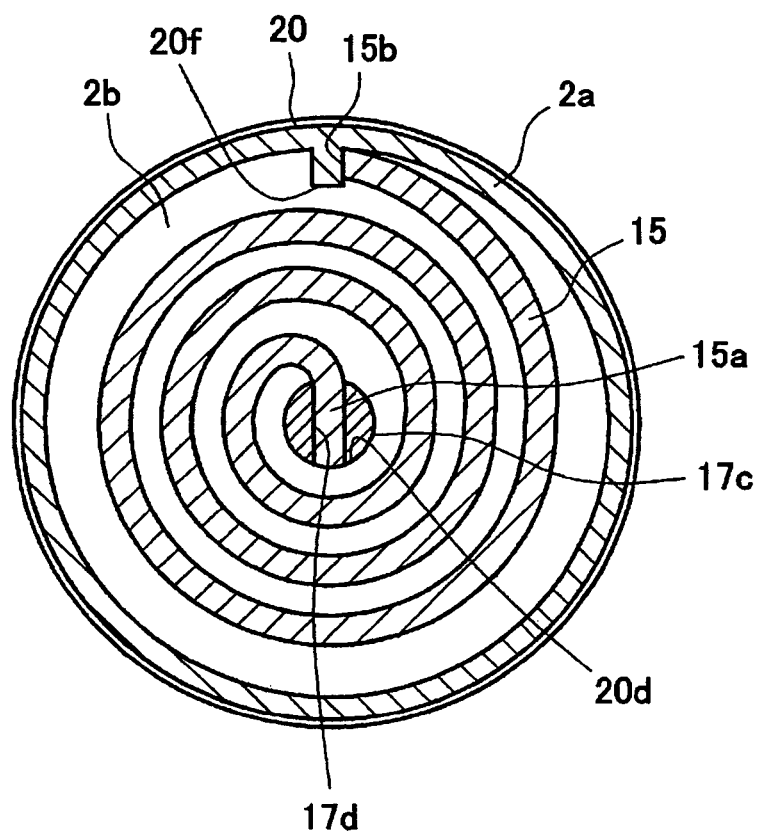
FIG. 6 is a front sectional view of FIG. 5.

The coil spring 15 is formed into the spiral shape as is shown in FIG. 6 of a spring steel material having a rectangular shape in cross section. An initiating end of the coil spring 15 has a hook piece 15a and a terminating end thereof is made into an engagement portion 15b. The rectangular sectional form includes a laterally elongated rectangular shape and a vertically elongated rectangular shape.

This coil spring 15 is accommodated within the elastic member holding member 20 with the hook piece 15a inserted into a locking slit 18d on the boss 17c and the engagement portion 15b brought into abutment with the pressing projection 20f.

Referring back to FIG. 5, an outer ring raceway 32a which constitutes the ball bearing portion 32 is formed on an inner circumferential side of a pulley main body 2b of the alternator pulley 2 at the other axial end side (a right-hand side) thereof. In addition, cam planes 3c which constitute the clutch mechanism 6 are formed on an outer circumferential surface 3b of a shaft main body 3a of the alternator shaft 3 at an axial end side (a left end side). An inner ring raceway 32b which constitutes the bearing Portion 32 is formed at the other axial end side (a right-hand side) thereof. A plurality of balls 32c (rolling elements) are disposed between the outer ring raceway 32a and the inner ring raceway 32b so as to enable a relative rotation between the alternator pulley 2 and the alternator shaft 3. In addition to double rows shown in the figure, the balls 32c of the ball bearing portion 32 may be arranged in a single row.

In the clutch mechanism 6, the one-way clutch portion 18 having a function to switch between power transmission and power interruption is provided radially outwards of the alternator shaft 3 as with the one-way clutch portion 8 in FIG. 1 (Embodiment 1).

Next, the operation of the pulley unit 1b that is configured as has been described above will be described based on FIGS. 5 and 6. The alternator pulley 2 shown in FIG. 5 is rotating at a set rotation speed (for example, 5000 rpm) in a clockwise direction as viewed from a direction indicated by an arrow A in the figure. As this occurs, as is shown in FIG. 6, the coil spring 15 which is disposed on an upstream side of a power transmission path is restricted from rotating by the boss 17c of the support member 17 at the hook piece 15a. Because of this, the coil spring 15 elastically deforms by virtue of a pressing force applied to the engagement portion 15b when it is brought into abutment with the pressing projection 20f of the elastic member holding member 20 which rotates together with the alternator pulley 2. By this deformation power is transmitted to the support member 17 which constitutes the one-way clutch portion 18.

In this one-way clutch portion 18, as with the one-way clutch portion 8 in FIG. 1 (Embodiment 1), when the alternator pulley 2 rotates in the clockwise direction, a locked state (a power transmissive state) is produced. Consequently, power produced by the rotation of the alternator pulley 2 is transmitted sequentially to the coil spring 15, the support member 17, the clutch mechanism 6 and the alternator shaft 3 in that order.

Here, when the rotation speed of the alternator pulley 2 surpasses the rotation speed of the alternator shaft 3 (when the rotation speed of the alternator shaft 3 lowers below the rotation speed of the alternator pulley 2), since the one-way clutch portion 18 (the clutch mechanism 6) holds the locked state, the power transmission from the alternator pulley 2 to the alternator shaft 3 continues.

On the other hand, when the rotation speed of the alternator pulley 2 lowers below the rotation speed of the alternator shaft 3 by a predetermined value or larger (when the rotation speed of the alternator shaft 3 surpasses the rotation speed of the alternator pulley 2 by the predetermined value or larger), as is shown in FIG. 3(b), the alternator shaft 3 seemingly rotates in the counterclockwise direction. Then, rollers 8c which have been squeezed to a narrow side of wedge-shaped spaces K move to a wide side of the same spaces, whereby the locked state is released. By the locked state being released in this way, the clutch mechanism 6 is put in a free state (a power interruption state), whereby the one-way clutch portion 18 interrupts the power transmission from the alternator pulley 2 to the alternator shaft 3. However, since the bush 19 is disposed between the alternator pulley 2 and the coil spring 15 (the support member 17), even in the event that the one-way clutch portion 18, interrupts the power transmission, the bush 19 can rotate together with the alternator pulley 2, the wear of the bush 19 by rotational sliding of the coil spring 15 (the support member 17) is made difficult to occur.

Note that a pulsating minute change in rotation that is produced on the induction, compression, combustion and expansion and exhaust strokes is absorbed (reduced) by the elastic deformation of the coil spring 15.

Embodiment 4

Figure 7:
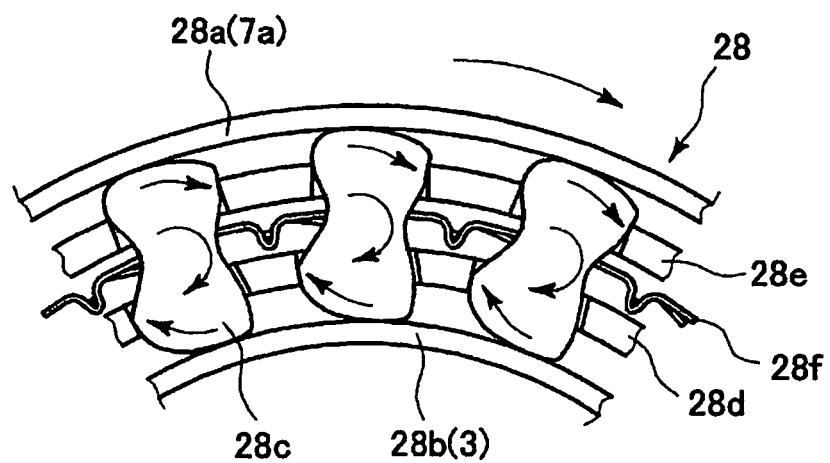
FIG. 7 is an operation diagram of a sprag type one-way clutch portion.
Figure 7:
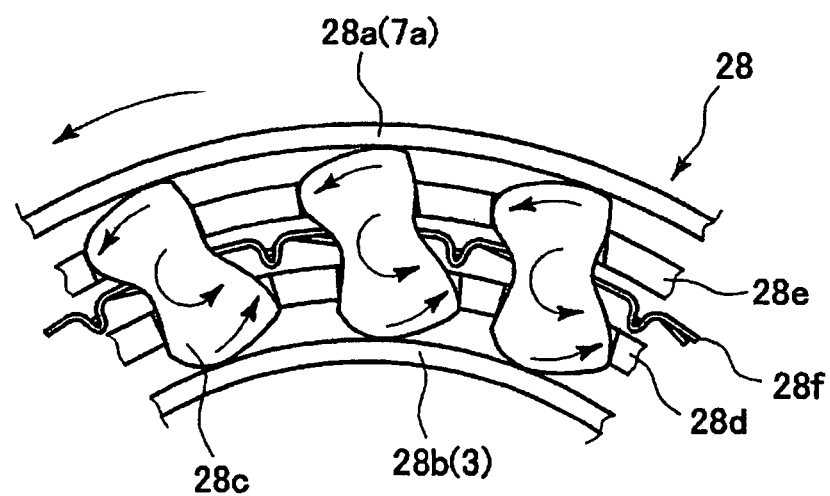

Next, FIG. 7 is an explanatory diagram showing the operation of a pulley unit which utilizes a sprag type one-way clutch. In FIG. 7, the roller type one-way clutch portion 8 shown in FIG. 3 (Embodiment 1) is changed to a sprag type one-way clutch portion 28. In the one-way clutch portion 28, a cylindrical portion 7a of a support member 7 is made to function as an outer ring 28a, and an alternator shaft 3 is made to function as an inner ring 28b. The one-way clutch portion 28 includes a plurality of sprags 28c which are disposed in an annular space defined between the outer ring 28a and the inner ring 28b with their axes oriented to follow an axial direction, an annular inner ring side cage 28d and an annular outer ring side cage 28e which retain the sprags 28c in position within the annular space and an annular spring 28f.

The sprags 28c are disposed lopsided relative to planes which confront the outer ring 28a and the inner ring 28b, and their lopsided state is maintained by the inner ring side cage 28d and the outer ring side cage 28e. Then, when the outer ring 28a rotates in the clockwise direction, the sprags 28c are tilted further in a rightward direction by virtue of a frictional force applied to contact portions between the outer ring 28a and the sprags 28c, which produces a locked state in which the sprags 28c are strongly squeezed between the outer ring 28a and the inner ring 28b, whereby power is transmitted. On the other hand, when the outer ring 28a rotates in the counterclockwise on the contrary, the sprags 28c are tilted in a leftward direction, which produces a free state in which the sprags 28c are released from the state in which they are squeezed between the outer ring 28a and the inner ring 28b, whereby the power transmission is interrupted.

The invention claimed is:

1. A pulley unit in which a rotation adjusting mechanism is interposed in a transmission path from a pulley around which a belt is wound to a rotating shaft disposed concentrically with and rotatable along with the pulley, wherein the rotation adjusting mechanism comprises:
   an elastic member provided in an upper position of the transmission path and configured to elastically deform based on a change in a rotation generated in at least one of the pulley and the rotation shaft;
   a clutch mechanism provided in an intermediate position of the transmission path between the elastic member and the rotating shaft and configured to interrupt a power transmission from the pulley to the rotating shaft when a rotation speed of the pulley is less than a rotation speed of the rotating shaft by a predetermined value; and
   a holding member disposed between the pulley and the rotating shaft and is configured to restrict a radial relative displacement of the elastic member while permitting a circumferential relative displacement between the pulley and the elastic member,
   wherein a minute change in the rotation generated between the pulley and the rotation shaft is reduced by an elastic deformation of the elastic member, and
   wherein a change in the rotation generated between the pulley and the rotation shaft which is greater than the minute change in the rotation is eliminated by an interruption of the power by the clutch mechanism.

2. The pulley unit according to claim 1, wherein the clutch mechanism is disposed radially outwards of the rotating shaft along a circumferential direction, and wherein the elastic member is disposed radially outwards of the clutch mechanism along the circumferential direction.

3. The pulley unit according to claim 2, wherein the elastic member is disposed to surround the clutch mechanism and comprises a coil spring having a rectangular shape in cross section.

4. The pulley unit according to claim 1, wherein the clutch mechanism is disposed radially outwards of the rotating shaft along a circumferential direction, and wherein the elastic member is disposed at one axial end portion of the clutch mechanism so as to elastically deform in a plane which intersects an axis of the rotating shaft.

5. The pulley unit according to claim 4, wherein the elastic member comprises a spiral coil spring disposed on a plane perpendicular to the axis of the rotating shaft.

6. The pulley unit according to claim 1, wherein one of the pulley and the rotating shaft serves as a drive member and an other of the pulley and the rotating shaft serves as a driven member, and
   wherein the rotation adjusting mechanism is interposed in the transmission path from the drive member to the driven member.

7. The pulley unit according to claim 1, wherein the pulley, the elastic member, the clutch mechanism and the rotation shaft are arranged in order radially from an outside toward an inside of the pulley unit.

8. The pulley unit according to claim 1, wherein said pulley comprises:
   a pulley main body; and
   a bush mounting step portion formed on an inner circumferential side of the pulley main body at an axial end side thereof.

9. The pulley unit according to claim 8, further comprising a support member provided between the rotating shaft and the clutch mechanism, said support member comprising a cylindrical portion formed into a cylindrical shape and a disc-shaped flange portion which projects outward from an axial end side of the cylindrical portion,
   wherein the cylindrical portion and the disc-shaped flange portion are formed integrally.

10. The pulley unit according to claim 9, wherein the holding member is disposed between an outer circumferential surface of the flange portion and the bush mounting step portion of the pulley main body.

11. The pulley unit according to claim 10, wherein an outer circumferential side of the bush is fixedly press fitted in the bush mounting step portion and an inner circumferential side of the bush is provided on the outer circumferential surface of the flange portion to slide freely thereon.

12. A rotation adjusting mechanism, said rotation adjusting mechanism being interposed between a pulley and a rotating shaft provided radially inwards of the pulley, said rotation adjusting mechanism comprising:
   an elastic member provided radially outwards from the pulley and between the pulley and the rotating shaft, said elastic member being configured to deform elastically based on a change in a rotation of the pulley;
   a clutch disposed radially outwards of the rotating shaft and surrounded by the elastic member; and
   a holding member disposed between the pulley and the rotating shaft, said holding member being configured to restrict a radial relative displacement of the elastic member while permitting a circumferential relative displacement between the pulley and the elastic member.

13. The rotation adjusting mechanism according to claim 12, further comprising a support member, said support member being disposed between the rotating shaft and the pulley and being configured to contain the elastic member and the clutch, said support member being disposed concentrically with the pulley and the rotating shaft, wherein the holding member is disposed between the support member and the pulley.

14. The rotation adjusting mechanism according to claim 12, wherein the elastic member comprises a coil spring, and wherein a terminating end of the coil spring is received in a spring recess portion defined within the support member.

15. The rotation adjusting mechanism according to claim 12, wherein the clutch, in a locked state, allows a power transmission to occur between the pulley and the rotating shaft, wherein the clutch, in a released state, interrupts the power transmission between the pulley and the rotating shaft, and wherein the clutch is configured to be in the locked state when a rotation speed of the pulley is less than a rotation speed of the rotating shaft by a predetermined amount and the clutch is configured to be in the released state when the rotation speed of the pulley is greater than the rotation speed of the rotating shaft.

16. The rotation adjusting mechanism according to claim 12, wherein the holding member is disposed between the pulley and the elastic member and is configured to rotate together with the pulley when the clutch is in the released state.

17. A pulley unit, comprising:

a pulley;

a rotating shaft provided radially inwards of the pulley;

an elastic member provided radially outwards from the pulley and between the pulley and the rotating shaft, said elastic member being configured to deform elastically based on a change in a rotation of the pulley;

a clutch disposed radially outwards of the rotating shaft and surrounded by the elastic member; and a holding member disposed between the pulley and the rotating shaft, said holding member being configured to restrict a radial relative displacement of the elastic member while permitting a circumferential relative displacement between the pulley and the elastic member.

18. The pulley unit according to claim 17, wherein a minute change in the rotation generated between the pulley and the rotation shaft is reduced by an elastic deformation of the elastic member, and wherein a change in the rotation generated between the pulley and the rotation shaft which is greater than the minute change in the rotation is eliminated by an interruption of the power by the clutch.

\* \* \* \* \*